July 10, 1934. V. G. APPLE Re. 19,230

BRAKE MECHANISM

Original Filed Nov. 14, 1929 2 Sheets-Sheet 1

Vincent G. Apple, deceased, INVENTOR,
Bendix Brake Company, assignee.
BY
Burton & McCoskey
ATTORNEYS.

July 10, 1934. V. G. APPLE Re. 19,230
BRAKE MECHANISM
Original Filed Nov. 14, 1929 2 Sheets-Sheet 2
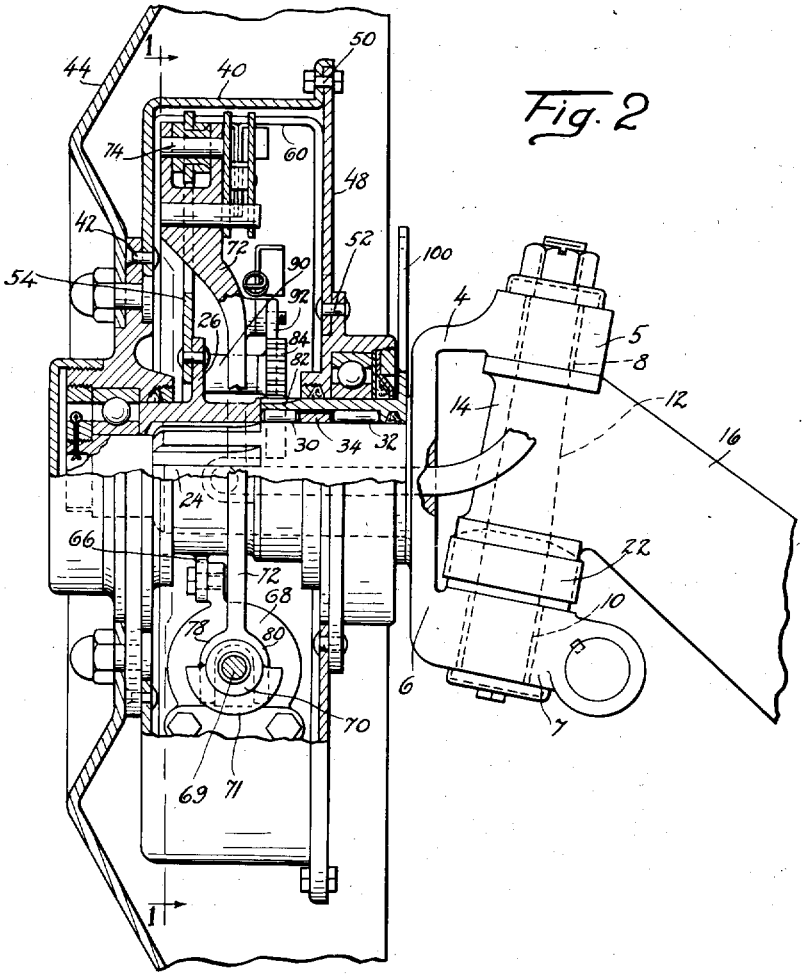
Vincent G. Apple, deceased, INVENTOR,
Bendix Brake Company, assignee.
BY
Barton & McConkey
ATTORNEYS.

Reissued July 10, 1934

Re. 19,230

UNITED STATES PATENT OFFICE 19,230

BRAKE MECHANISM

Vincent G. Apple, deceased, late of Dayton, Ohio, by Bendix Brake Company, South Bend, Ind., assignee Original No. 1,876,541, dated September 13, 1932, Serial No. 407,080, November 14, 1929. Application for reissue August 21, 1933, Serial No. 686,139

71 Claims. (Cl. 188—156)

Figure 1:
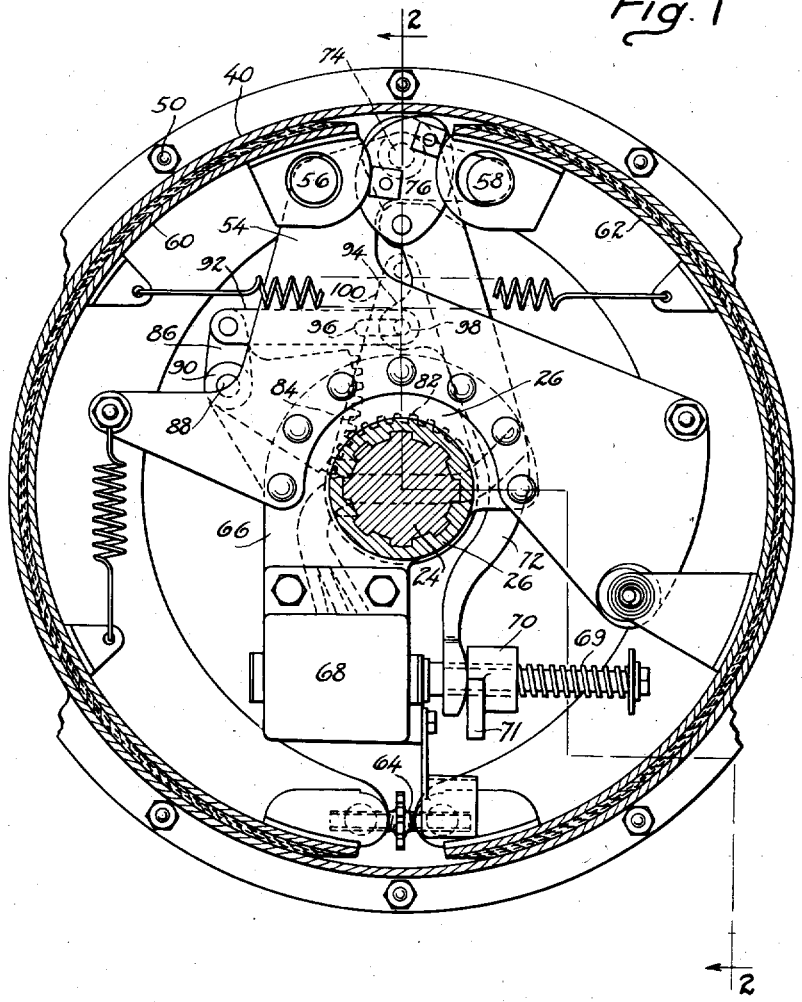

This invention relates to brakes and has particular reference to an assembly designed for use on an automobile and is here shown as installed for use on the front wheels of an automotive vehicle.

An object of the invention is to incorporate with a compact dirt and water proof assembly such as that disclosed herein, power mechanism, here illustrated in the form of an electric motor, and mechanical means for operating the brake shoes whereby the brakes may be manually applied from a point outside the drum enclosure by the vehicle operator either independently of or in conjunction with the electric motor means. An important feature is that the power means is supported within the enclosure, as in the brake and applying mechanism.

A further object of the invention is to utilize an electric motor as a power brake applying means in such a way that the brakes will be positively retained in their applied position while the motor is inoperative and in this way substantially conserve the amount of current taken from a storage battery or the like for the purpose of applying the brakes, in conjunction with improved manual operating mechanism for applying the brakes independently of the power means and permitting independent operation by the power means, all here shown as applied to a swivelled vehicle wheel.

The construction is such that the power mechanism is operable to apply the brakes, to retain the brakes applied, and to function to permit the release of the brakes. It is preferred to employ a reversibly rotatable power driven shaft disconnectedly coupled with the operable brake friction means to apply the same upon rotation of the shaft in a given direction, to retain the same applied upon discontinuance of rotation of the shaft, and to permit release thereof upon reverse rotation of the shaft. An important characteristic is that novel means for applying the brakes manually, in a construction of the character here shown, is provided.

Further objects and meritorious features of the invention will appear from the following description, taken in conjunction with the accompanying drawings, wherein like numerals refer to like parts throughout the several figures, and wherein:

Figure 1 is a section of the power brake assembly taken on the line 1—1 of Figure 2, and Figure 2 is a sectional view on the line 2—2 of Figure 1.

In the drawings the numeral 2 represents the usual steering spindle having radially extending arms 4 and 6 and carrying the hubs 5 and 7 for the bushings 8 and 10. The steering pivot pin 12 is secured in the hub 14 of the axle 16 and rotatably mounted in the bushings 8 and 10, with the anti-friction thrust bearing 22 under the hub 14 for the purpose of taking the vertical steering load.

On the outer end of the stub axle or spindle 24 is keyed the brake torque plate 26, and the sleeve 28 is rotatably journalled on the inner end thereof by means of the roller bearings 30 and 32, which are retained in spaced relation by means of the spacer 34. Secured to the outer and inner ends of the wheel and drum assembly are the bearing housings 36 and 38 respectively whereby the said assembly is rotatably journalled about the stub axle 24, bearing directly on the stub axle at its outer end and upon the sleeve 28 at its inner end.

The brake drum 40 is riveted as at 42 to the wheel 44. The inner bearing housing 38 is provided with a flange 46, and to this flange and the brake drum 40 is bolted the drum cover plate 48, as at 50 and 52, thereby forming a tight compartment within which the brake friction mechanism and the applying mechanism is sealed against water, dirt and oil to function in a highly efficient manner. The brake torque plate 26 is provided with a plurality of radially extending arms, one of which, 54, is provided with the studs 56 and 58 which serve as anchors for the brake shoes 60 and 62 respectively. The other two adjacent ends of the brake shoes are connected by the right and left adjusting screw 64. Inasmuch as the expanding mechanism for the shoes and the contemplated power means for operating the same are to be mounted entirely within the closed drum, the brake shoes have been made channel shaped in cross section to provide room for the operating parts as shown and herein described.

Secured to a depending flange 66 of the torque plate 26 is the reversible electric motor 68 which is provided with a threaded extension 69 to its armature shaft. Mounted for axial sliding movement along this extension is the correspondingly threaded weighted runner 70, the weighted portion being indicated as 71.

On the arm 54 of the torque plate 26 is pivoted the brake operating arm 72, as at 74, and to this arm is pivoted the camming mechanism indicated generally at 76, since it is of conventional design.

The other extremity of the brake arm is bifurcated to form the two prongs 78 and 80 (see Figure 1) which straddle the extension 69 of the motor armature shaft to swing axially therealong. The brakes have been illustrated in their "on" position, to which position they are moved when the motor is rotated in one direction and the axial movement of the runner 70 forces the brake arm 72 to swing to the left, thereby actuating the camming mechanism 76 to expand the brake shoes 60 and 62 against the internal periphery of the rotating brake drum 40. When the current through the motor is reversed, the armature shaft rotates in the opposite direction and the runner slides away to permit the return of the brake arm 72 to its "off" position through the operation of the customary return springs (not shown) acting through the medium of the camming mechanism 76.

The inertia of the weighted portion 71 of the nut 70 prevents the nut from rotating with the shaft when the shaft is rotatably driven and as a result the nut is caused to travel axially along the shaft. The thread of the shaft extension is of relatively low pitch and the brake shoes are thereby retained in whatever "on" position they may be when the circuit through the motor is broken and until the circuit through the motor is reversed. Upon reverse of the circuit through the motor the nut travels in the opposite direction over the shaft permitting the brake to be released under the pull of the provided release springs.

With this power brake assembly there is included means for mechanically actuating the brake arm 72 independently of the electric motor means. For this purpose the outer end of the sleeve 28 is provided with gear teeth 82 which are adapted to mesh with the gear teeth 84 on the sector lever 86. This sector lever 86 is pivoted at 88 in boss 90 which is formed on the brake torque plate 26. A link 92 connects the lever arm 86 of the gear sector 94 to the brake operating arm 72 through the medium of an elongated slot 96 in the link 92 which fits over a stud 98 in the said brake operating arm. In this way a slip joint between gear sector and the brake arm is provided whereby the said arm may be actuated by the gear sector either independently of or in conjunction with the power operating means and permits independent movement of the arm by the power operating means. A lever 100 is secured to the other end of the sleeve 28, preferably by welding it thereto, for the purpose of permitting actuation of the brake arm through the gear sector from a point outside the closed drum, and it is contemplated that this lever 100 will be connected through some mechanical linkage so that it may be actuated by the vehicle operator.

Having described one illustrative embodiment of the invention, various changes and modifications will be apparent to those skilled in the art, and for that reason it is intended to be limited only within the scope of the appended claims.

What is claimed:

1. Brake mechanism comprising a wheel spindle held against rotation by one end, an integral hollow drum closed at both ends rotatably supported thereon, internal expanding brake mechanism secured against rotation within the drum, electric motor means supported within the drum for expanding said brake mechanism, and mechanical means manually operable independently of the electric motor means for expanding the same.

2. Brake mechanism comprising a swivelled wheel spindle held against rotation by one end, an integral closed drum rotatably journalled thereon, radially expansible brake friction means secured against rotation within the drum, electric motor means supported within the drum for expanding the friction means, said motor means including means for retaining the friction means in applied position when the current is off, and mechanical means operable from a point outside the drum for independently expanding the friction means.

3. Brake mechanism comprising a swivelled wheel spindle, an integral closed brake drum rotatably journalled thereon, friction means and a reversible electric motor secured against rotation with the drum, means whereby rotation of the motor shaft in one direction applies the friction means and in the other permit their withdrawal and mechanical means extending outside the drum for actuating the friction means independently of the motor.

4. Brake mechanism comprising a swivelled wheel spindle, an integral closed brake drum rotatably journalled thereon, friction means and a reversible electric motor secured against rotation within the drum, means whereby rotation of the motor shaft in one direction applies said friction means and in the other permits their withdrawal, said means including means for retaining the friction means in any intermediate position when the circuit through the motor is broken, and means manually operable from a point outside the drum for actuating the friction means independently of the electric motor.

5. Brake mechanism comprising a swivelled wheel spindle held against rotation by one end, a sleeve having radially extending arms keyed thereto, an integral closed brake drum rotatably journalled thereon, radially expansible friction means and a reversible electric motor supported within the drum by said arms, operative connections between the electric motor shaft and the friction means, and mechanical linkage coupled with said operative connections and extending to a point outside the drum whereby the friction means may be manually expanded independently of the electric motor.

6. Brake mechanism comprising a swivelled wheel spindle, a closed brake drum rotatably journalled thereon, a sleeve having arms extending radially within the drum keyed to said spindle, radially expansible friction shoes and a lever for expanding them supported on one of said arms, a reversible electric motor having a threaded extension to its armature shaft secured to another of the arms, said lever having a bifurcated portion straddling said threaded extension, means axially slidable on said extension upon rotation thereof to actuate the lever arm, a gear sector pivoted to said radially extending arm and having a lost motion connection with the lever arm, and a sleeve rotatably journalled on the spindle having gear teeth in mesh with the gear sector and operable from a point outside the closed drum.

7. Brake mechanism comprising a swivelled wheel spindle held against rotation at one end, a closed brake drum rotatably journalled thereon, radially expansible brake shoes and a pivoted lever for expanding them secured against rotation within the drum, a sleeve rotatably journalled on the spindle and extending from a point within to a point outside said drum, gear teeth on the inner end of said sleeve, a pivoted gear sector within the drum meshing with the said teeth and having a slotted connection with said lever, and means on the outer end of the sleeve whereby the same may be rotated to expand the brake shoes.

8. Brake mechanism comprising, in combination, a non-rotatable axle, a closed drum rotatably journalled thereon, expansible friction means secured against rotation within the drum, a sleeve rotatable about said axle, operative connections within the drum between said friction means and said sleeve, including a gear sector, and means operable from a point outside said drum for rotating said sleeve.

9. Brake mechanism comprising, in combination, a non-rotatable axle, a closed drum rotatably journalled thereon, expansible friction means and a lever arm for expanding the same supported against rotation within the drum, a sleeve rotatable about said axle from a point outside the drum, and a lost motion connection between said lever and sleeve whereby rotation of the latter actuates the friction means.

10. Brake mechanism comprising, in combination, a non-rotatable axle, a closed drum rotatably journalled thereon, expansible friction means and a lever for expanding the same supported against rotation within the drum, a sleeve rotatable about said axle from a point outside the drum and provided with gear teeth at its inner extremity, a gear sector pivoting within the drum, and meshing with said gear teeth, and a lost motion connection between said gear sector and lever.

11. Brake mechanism comprising an axle member secured against rotation, radially expansible friction means supported thereby, an electric motor likewise supported thereby, means connecting said motor and friction means for expanding the latter, and independently operable mechanical means including a part rotatable about said axle member for manually expanding them.

12. Brake mechanism comprising an axle member secured against rotation, radially expansible friction shoes supported thereby, an electric motor having an armature shaft extending transversely of the axle member also supported thereby, means for expanding the friction shoes, means whereby rotation of said armature shaft functions to operate said expanding means, while permitting independent operation of said expanding means, and manually operable means engaging the expanding means to operate it independently of the electric motor and to permit independent operation thereof by the motor.

13. Brake mechanism as defined in claim 12 wherein the described assembly with the exception of the last mentioned mechanical means is completely enclosed in a rotatable brake drum.

14. Brake mechanism comprising a rotatable brake drum closed at both ends, expansible friction means secured against rotation within the drum, an electric motor secured against rotation therein, means connecting said motor and friction means operable upon rotation of the motor armature shaft in one direction to apply the friction means to the drum and upon rotation of the shaft in the other direction to permit release of the brakes, and mechanical means independently operable from outside the drum for expanding said friction means including a part extending axially rotatably through the drum.

15. Brake mechanism comprising, in combination, a rotatable drum, brake friction means therein, cam means for expanding said friction means arranged adjacent one periphery of the drum, a reversible electric motor supported on the opposite side of the drum having an armature shaft, means whereby rotation of the armature shaft in one direction operates said friction means and rotation in the opposite direction permits retraction of the friction means, and independently operable mechanical means for manually actuating the friction means.

16. Vehicle brake mechanism comprising, in combination, a rotatable drum, brake friction means arranged therein to be urged thereagainst, a reversible electric power device arranged within the drum, an operating member coupled with the friction means and disconnectedly coupled with the power device to be actuated thereby to urge the friction means against the drum, manual operating mechanism disconnectedly coupled with the operating member to urge the friction means against the drum.

17. Vehicle brake mechanism comprising, in combination, a rotatable drum, brake friction means arranged therein to be urged thereagainst, a reversible electric power device arranged within the drum, an operating member coupled with the friction means and disconnectedly coupled with the power device to be actuated thereby to urge the friction means against the drum, manual operating mechanism disconnectedly coupled with the operating member on the opposite side of the axis of the drum from the power means to urge the friction means against the drum.

18. Brake mechanism including, in combination, a non-rotatable axle member, radially expansible friction shoes supported thereby, a reversible electric motor likewise supported thereby having a threaded armature shaft extending transversely of the axle member, a correspondingly threaded runner on said shaft, means whereby said runner operates on rotation of the armature shaft in one direction to expand the friction means and on rotation in the other to permit retraction thereof, and independently operable means for manually expanding the friction means.

19. In brake mechanism, a rotatable drum, brake friction means arranged within the drum, an operating member coupled therewith to urge the friction means against the drum, electric power means within the drum having a reversibly rotatably driven threaded shaft, a threaded runner on the shaft adapted to be advanced thereover during its rotatiton and coupled with said operating member to actuate it to urge the friction means against the drum, said threaded runner adapted to retain its position on the shaft upon discontinuance of rotation thereof to hold the operating member against movement of release of the friction means, manual operating means coupled with said operating member to actuate the same to urge the friction means against the drum, tension means engaging said friction means to release the same following actuation by the manual means insufficient to release the friction means against the restraint offered by the runner to movement of the operating member following application by the power means.

20. In brake mechanism, a rotatable drum, brake friction means arranged within the drum, an operating member coupled therewith to urge the friction means against the drum, electric power means within the drum having a reversibly rotatably driven threaded shaft, a threaded runner on the shaft adapted to be advanced thereover during its rotation and coupled with said operating member to actuate it to urge the friction means against the drum, said runner being weighted to retain the position to which it has been advanced upon the shaft, and manual means coupled with the operating member to apply the friction means independently of the power means.

21. In brake mechanism, a rotatable drum, brake friction means arranged therein, operating mechanism coupled with the friction means including a reversibly rotatably driven shaft and a weighted runner coupled therewith to be advanced thereover upon rotation of the shaft and coupled with the friction means to actuate the same as it advances over the shaft, and manual means coupled with the friction means to urge it against the drum independently of the rotation of the shaft.

22. Automotive vehicle brake mechanism comprising a rotatable brake drum, friction means within said drum adapted to retard rotation of the same, an actuating member coupled with said friction means, a power driven rotatable element in operative relation to said actuating means, and a member slidable along and disconnectedly associated with said rotatable element and said actuating member for operating the friction means.

23. Brake mechanism comprising, in combination, a rotatable brake drum, friction means supported within said drum, and rotary electric motor power means supported therein disconnectedly coupled with said friction means to actuate the same.

24. Brake mechanism comprising, in combination, a rotatable brake drum, friction means supported within said drum. rotary electric motor power means supported therein disconnectedly coupled with said friction means to actuate the same, and manually operable means for actuating said friction means independently of said power means.

25. Brake mechanism comprising a sleeve secured against rotation, radially expansible brake shoes and cam arm for expanding them supported thereby, a reversible electric motor having a threaded armature shaft also supported by said sleeve, a correspondingly threaded runner on said shaft, spring means tending to retain said brake shoes in their retracted position, and means on said cam arm abutting said runner on one side only whereby the shoes are expanded upon rotation of the armature shaft in one direction.

26. Automotive vehicle wheel brake mechanism comprising a non-rotatable axle member, a vehicle supporting wheel rotatably mounted thereon, a completely closed drum secured to said wheel for rotation therewith, and friction means adapted to retard rotation of said drum and electric means for actuating the same each secured against rotation within said drum.

27. Automotive vehicle wheel brake mechanism comprising a non-rotatable axle member, a vehicle supporting wheel rotatably mounted thereon, a completely closed drum secured to said wheel for rotation therewith, and friction means adapted to retard rotation of said drum and electric means for actuating the same each secured against rotation within said drum by the same element.

28. Automotive vehicle wheel brake mechanism comprising a non-rotatable axle member, a vehicle supporting wheel rotatably mounted thereon, a completely closed drum secured to said wheel for rotation therewith, a plate within said drum secured against rotation by said axle member, and electric means for applying friction to said drum supported by said plate.

29. Automotive vehicle wheel brake mechanism comprising a non-rotatable axle member, a vehicle supporting wheel rotatably mounted thereon, a closed drum secured to said wheel for rotation therewith, radially extending arms supported within said drum by said axle member, electro-magnet means supported by one arm, friction means positioned by the other arms for engagement with said drum, and operative connections between the electro-magnet means and said friction means.

30. In combination with a rotatable brake drum, a plurality of arms fixedly positioned within said drum, friction means positioned with relation to said drum by certain of said arms, power mechanism supported within said drum by another of the arms, and operative connections between said power means and said friction means for actuating the latter.

31. Braking mechanism comprising a pivoted wheel spindle held against rotation by one end, a hollow drum closed at both ends rotatably supported thereon, internal expanding brake shoes of channel shaped cross-section secured against rotation within the drum, an electro-magnetically operated power means extending between the webs of the channel shaped shoes to move said shoes radially, and means secured to the spindle within the drum to support said power means.

32. In combination with a completely enclosed internal expanding brake mechanism, an electric motor having an armature shaft with a threaded extension, a brake shoe actuating arm having a bifurcated end portion straddling said shaft extension, and a weighted runner mounted on said extension adapted to contact the bifurcated portion of the brake shoe actuating arm.

33. Brake mechanism comprising brakes, a power device including a rotatable shaft, an actuating element coupled with said brakes and movable longitudinally of said shaft, a member slidable along said shaft on rotation thereof coupled with the actuating element, said member being adapted to shift from slidable to rotary movement upon encountering a determined resistance by the brakes, and means for manually operating said brakes independently of said rotatable shaft.

34. Vehicle brake mechanism including radially expansible friction shoes, an expanding cam member pivotally supported between the ends of said shoes, an electric motor having a threaded armature shaft positioned adjacent said shoes, an actuating arm fixedly secured at one end to said cam member and bifurcated at its opposite end to straddle said armature shaft, and a threaded runner positioned upon said shaft and engageable with the bifurcated portion of the actuating arms to positively urge the same in brake applying direction.

35. In combination with a brake shoe actuating arm bifurcated at its free end, a threaded electric motor armature shaft extending through the bifurcation, one face of the bifurcated portion being convexly rounded, and a threaded runner positioned on said armature shaft, said runner having a flat end face engageable with the convexly rounded surface of the actuating arm.

36. In brake mechanism a rotatable drum, brake friction means arranged within the drum, an operating member coupled therewith to urge the friction means against the drum, electric power means within the drum having a reversibly rotatably driven threaded shaft, a threaded runner on the shaft adapted to be advanced thereover during its rotation and disconnectedly coupled with said operating member to actuate it to urge the friction means against the drum, said threaded runner adapted to retain its position on the shaft upon discontinuance of rotation thereof to hold the operating member against movement of release of the friction means.

37. In brake mechanism, a rotatable drum, brake friction means arranged within the drum, an operating member coupled therewith to urge the friction means against the drum, power means within the drum having a reversibly rotatably driven threaded shaft, a threaded runner on the shaft adapted to be advanced thereover during its rotation and coupled with said operating member to actuate it to urge the friction means against the drum, said runner being weighted to retain the position to which it has been advanced upon the shaft.

38. In brake mechanism, a rotatable drum, brake friction means arranged therein, operating mechanism coupled with the friction means including a reversibly rotatably driven shaft and a weighted runner coupled therewith to be advanced thereover upon rotation of the shaft and coupled with the friction means to actuate the same as it is advanced over the shaft.

39. Automotive vehicle brake mechanism comprising a rotatable brake drum closed at each end, friction means within said drum adapted to retard rotation of the same, an actuating member coupled with said friction means and a rotatable operating element positioned within the drum disconnectedly and frictionally coupled with the actuating element adapted to become ineffective upon encountering a determined resistance to said friction means.

40. In combination with brake mechanism of the class described, including an actuating arm, a threaded shaft adjacent said arm, a runner positioned on said shaft and having limited frictional engagement with one face of the actuating arm, which said runner normally slides along the shaft to move the actuating arm but is free to rotate with said shaft when the arm offers a determined resistance to such sliding movement, and yieldable retracting means constantly urging said arm against said runner.

41. In combination with a brake shoe actuating arm bifurcated at its free end, a threaded shaft extending through said bifurcation, means for rotating said shaft, a threaded runner slidable along said shaft and having a depending weighted portion, the end face of the runner and one face of said actuating arm having limited frictional engagement whereby said runner is free to rotate with the shaft when said actuating arm offers a predetermined resistance to longitudinal sliding movement of said runner.

42. In combination with brake mechanism of the class described, including an actuating arm, a threaded shaft adjacent said arm, a runner positioned on said shaft and having limited frictional engagement with one face of the actuating arm, which said runner normally slides along the shaft to move the actuating arm but is free to rotate with said shaft when the arm offers a determined resistance to such sliding movement.

43. Brake mechanism including, in combination, friction members having adjacent separable ends, a cam rotatably journalled between said ends, a lever coupled with said cam to actuate the same, power means lying within the plane of the friction members and coupled with said lever, and independently operable means coupled with said lever for manual operation.

44. Brake mechanism including, in combination, a non-rotatable swivelled wheel spindle, a torque plate having a laterally extending stud and a laterally extending boss thereon, a brake actuating lever fulcrumed on said stud, a laterally extending stud on said lever, a gear sector pivoted on said boss, a link pivoted on said gear sector and having slotted connection with said lever stud, a sleeve rotatably journalled on said spindle having gear teeth adapted to mesh with those on said gear sector, and means for rotating said sleeve.

45. Brake mechanism including, in combination, a wheel, brake mechanism operable to retard rotation of said wheel, power mechanism lying within the plane of said wheel operable through the medium of a leverage corresponding substantially in length to the diameter of said wheel to actuate said brake mechanism, and means manually operable independently of said power mechanism through said leverage to actuate said brake mechanism.

46. In combination with a wheel structure including brake mechanism, power means within the circumference of said wheel operable upon a cam arm to apply said brake mechanism, and manual means operable independently of said power means upon said arm to apply the same.

47. In combination with a wheel having a drum secured for rotation therewith, a flanged sleeve secured against rotation within the plane of said drum, friction means within said plane operable to retard rotation of said drum, power means supported by the flange of said sleeve, and means lying within the plane of the drum operable through a leverage corresponding substantially in length to the diameter of said drum to actuate said friction means.

48. In combination with a wheel having a closed drum secured for rotation therewith, a radially flanged sleeve secured against rotation within said drum, friction means supported therein adapted to retard rotation thereof, and means for actuating said friction means and power means operable upon said actuating means supported by the flange of said sleeve.

49. In combination with a spindle, a brake drum closed at each end rotatably journalled upon said spindle, a flanged sleeve secured to said spindle between the ends of said drums, retarding means operable upon said drum positioned therein by means of said sleeve, a second sleeve rotatably journalled about said spindle adjacent said first mentioned sleeve and including an arm positioned exteriorly of the drum, and means operable by rotation of said sleeve for actuating said retarding means.

50. Vehicle brake mechanism comprising, in combination, a rotatable brake drum closed at each end and having a bearing at each end, brake friction means and an electric motor secured against rotation within the drum, means connecting the motor and friction means whereby rotation of the former operates the friction means, and mechanical means operable independently of the motor means from a point outside the drum to actuate the friction means.

51. Vehicle brake mechanism comprising a non-rotatable axle member, radially expansible friction means and electric motor means for expanding them supported by the hub, a rotatable brake drum completely enclosing the shoes and motor means, and mechanical linkage coupled with the shoes within the drum and extending through said drum to the outside thereof for independent manual actuation.

52. Automotive vehicle brake mechanism comprising a rotatable brake drum journalled at each end, friction means within said drum adapted to retard rotation thereof, an actuating member positioned within the drum and coupled with said friction means, a rotatable operating element arranged within the drum and disconnectedly coupled with the actuating element to operate the same and adapted to become ineffective upon encountering a determined resistance, and means for operating said actuating member independently of said rotatable operating element.

53. Brake mechanism comprising a non-rotatable axle, an axle member secured against rotation thereon having radially extending arms, brake friction means supported by said axle member, a cam lever pivoted to one of the arms thereof, electric power means supported by the axle member for actuating said cam lever, a rotatable drum enclosing said friction means and means rotatable about the axle member operable from outside the drum for actuating the cam lever independently of the electric power means.

54. Automotive vehicle wheel brake mechanism comprising a non-rotatable axle member, a vehicle supporting wheel rotatably mounted thereon, a closed drum secured to said wheel for rotation therewith, a plate within said drum secured against rotation by said axle member, electric means for applying friction to said drum supported by said plate, and means manually operable from a point outside said drum to apply friction to the drum.

55. Automotive vehicle wheel brake mechanism comprising a non-rotatable axle member, a vehicle supporting wheel rotatably mounted thereon, a closed drum secured to said wheel for rotation therewith, radially extending arms supported within said drum by said axle member, electric means supported by said arm for applying friction to the internal periphery of said drum, and means manually operable from a point outside said drum to apply friction to said internal periphery.

56. Braking mechanism comprising a non-rotatable axle, a hollow drum self enclosed at the ends, a bearing at each end to support said drum for rotation about said axle, internal expanding brake members between said bearings within said drum, means associated with said axle to support said members for radial movement and against rotation, power means within said drum to move said members radially, and means extending outside said drum adapted to move said members independently of said power means.

57. Braking mechanism comprising a non-rotatable axle and a rotatable brake drum closed at the ends supported for rotation about said axle, a non-rotatable axle member on the axle having arms extending radially outward into the space within the drum, brake shoes held by the arms against rotation but for radial movement, power applying means coupled with the shoes to move them into braking engagement and supported on one of said arms and manually operable means extending from within the drum enclosure whereby the shoes may be moved radially independently of the power applying means.

58. Brake mechanism comprising a non-rotatable axle, a brake drum rotatable thereon and closed at its ends, an anti-friction bearing in each closed end to support said drum for rotation thereabout, a housing surrounding each anti-friction bearing, braking mechanism between said housings within said drum enclosure, and means extending from within the drum for actuating said braking mechanism.

59. Brake mechanism comprising, in combination, a non-rotatable axle member, a brake drum closed at both ends rotatable about the axle member, expansible friction means arranged within the drum to be urged thereagainst, power means arranged within the drum coupled with the friction means to expand the same and having a power supply inlet extending through the axle member, and manually operable means rotatable about the hub coupled within the drum to the friction means operable to actuate the same independently of the power means.

60. Brake mechanism comprising, in combination, a non-rotatable axle member, an integral closed brake drum rotatable about the axle member, brake friction means arranged within the drum, operating mechanism within the drum to urge the friction means against the drum, power means within the drum coupled with the operating mechanism to actuate it, manually operable means within the drum coupled with the operating mechanism to actuate it independently of the power means.

61. Brake mechanism comprising, in combination, a non-rotatable axle member, an integral closed brake drum rotatable about the axle member, brake friction means arranged within the drum, a brake lever within the drum operable to actuate the friction means and extending across the drum, power means within the drum, manually operable means within the drum, said power means and manually operable means arranged on opposite sides of the axis of the drum and each coupled with the lever to actuate the same.

62. Brake mechanism comprising an axle member secured against rotation, radially expansible friction shoes supported thereby, an electric motor having an armature shaft extending transversely of the axle member and also supported thereby, means for expanding the friction shoes, and a disconnected coupling between said shaft and expanding means whereby rotation of said armature shaft functions to operate said expanding means.

63. Braking mechanism comprising a wheel spindle held against rotation by one end, a hollow drum closed at both ends rotatably supported thereon, internal expanding brake friction means secured against rotation within the drum, electric power means positioned within the drum and disconnectedly coupled with said brake friction means through a frictional coupling to actuate the same, said frictional coupling retaining the shoes in any intermediate position when the electric circuit is broken.

64. Vehicle brake mechanism comprising a swivelled wheel spindle, a closed brake drum journalled thereon, an axle member having radially extending arms secured thereto, radially expansible friction shoes and a lever arm for actuating them supported on one of said arms, a reversible electric motor having a threaded extension to its armature shaft secured to another of said arms, said lever having a bifurcated portion straddling said threaded extension, and means axially slidable on said shaft extension upon rotation thereof to actuate the lever arm.

65. Braking mechanism comprising a non-rotatable axle, a hollow drum completely closed at the ends supported for rotation about said axle, expansible brake friction means within the enclosure of said drum, means connecting said friction means and said axle to hold it against rotation, camming means at one side of said enclosure to force the friction means into contact with the drum, electro-magnetic means diametrically opposite said camming means, and operating linkage connecting said electro-magnetic means to said camming means.

66. Braking mechanism comprising a non-rotatable wheel spindle, a bearing on the outer end of said spindle, a bearing on the inner end of said spindle, a brake drum closed at both ends, each closed end having support on one of said bearings, an axle member keyed to said spindle between said bearings, a brake shoe supporting plate secured to said axle member, radially expansible friction shoes mounted on said supporting plate, an electro-magnetic device for expanding said shoes into contact with the interior circumference of said drum, and a cable entering said spindle at a point inside the inner bearing and extending internally lengthwise thereof toward its outer end to a point between the two bearings, thence outwardly to said electro-magnetic device.

67. Braking mechanism comprising, a non-rotatable wheel spindle having a shouldered inner end, a threaded outer end and a multiple keyed middle portion, a correspondingly keyed spacing member arranged upon said middle portion, an anti-friction bearing on said spindle between the inner end of the spacing member and the shoulder of the spindle, an anti-friction bearing on the outer end of the spindle adjacent the opposite end of the spacing member, outwardly expansible friction means secured to said spacing member, a rotatable brake drum having both ends closed and a housing for one of said anti-friction bearings in each closed end surrounding said friction means.

68. A vehicle wheel mounted on a spindle swivelled for turning movement and provided with a brake drum, friction means arranged within the drum, a torque taking member carried by the spindle and having oppositely directed arms extending generally in the direction of the swivelling axis of the wheel, one of said arms provided with spaced anchors arranged on opposite sides of and beyond one end of the swivelling axis of the wheel, power mechanism carried by the other arm arranged in proximity to the other end of the swivelling axis of the wheel and diametrically across the drum from said anchors, an operating lever pivoted at one end to one arm between said anchors and extending along the swivelling axis of the wheel and connected with the power mechanism at its opposite end in proximity to the other end of the swivelling axis and thrust means carried by the pivoted end of the lever and operatively engaging said friction means.

69. Braking mechanism comprising, a non-rotatable axle, a hollow drum closed at its ends, a bearing in each closed end to support said drum for rotation about said axle, brake shoes of channel shaped cross-section between said bearings within said drum, means held against rotation by said axle to support said shoes for radial movement and against rotation about said axle, and electro-magnetic power means located between the webs of the channel shaped shoes to move said shoes radially.

70. Brake mechanism comprising an axle member secured against rotation, a rotatable drum, radially expansible friction means supported by the axle member, an actuating member associated with the friction means to expand the same, an electric motor supported by said axle member, and means disconnectedly coupling said motor and said actuating member for operating the latter.

71. Brake mechanism including, in combination, non-rotating radially expansible brake shoes channel shaped in cross section, cam means adjacent a periphery of the shoes for expanding them, electromagnetic means having an armature movable in a direction transverse to the axis of the shoes and extending in close proximity thereto intermediate the flanges thereof, a connecting arm between said cam means and said armature, and mechanical means for actuating said arm independently of the electro-magnet.

BENDIX BRAKE COMPANY,
*Assignee of Vincent G. Apple, Deceased,*
By DAVID L. GALLUP.